(12) United States Patent
Schreiber et al.

(10) Patent No.: US 6,917,868 B2
(45) Date of Patent: Jul. 12, 2005

(54) METHOD AND DEVICE FOR ADJUSTING A TORQUE OUTPUT OF A POWER TRAIN OF A MOTOR VEHICLE

(75) Inventors: Achim Schreiber, Schwieberdingen (DE); Klaus Ries-Mueller, Bad Rappenau (DE); Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 10/387,748

(22) Filed: Mar. 13, 2003

(65) Prior Publication Data

US 2003/0216217 A1 Nov. 20, 2003

(30) Foreign Application Priority Data

Mar. 16, 2002 (DE) .......................... 102 11 696
Oct. 4, 2002 (DE) .......................... 102 46 422

(51) Int. Cl.$^7$ .............................................. G06F 17/00
(52) U.S. Cl. ............................ 701/51; 477/34; 477/37; 474/23

(58) Field of Search ........................ 701/51, 60; 474/23; 477/34, 37, 39, 44

(56) References Cited

U.S. PATENT DOCUMENTS 4,793,454 A  * 12/1988  Petzold et al. ................ 477/39
5,954,178 A  *  9/1999  Fischer et al. ................ 192/90

FOREIGN PATENT DOCUMENTS

EP          0 451 887 B1     6/1995

* cited by examiner

*Primary Examiner*—Yonel Beaulieu
(74) *Attorney, Agent, or Firm*—Baker & Daniels

(57) ABSTRACT

A method and apparatus for adjusting the torque output of a power train of a motor vehicle. An engine is connected to the input end of a continuously variable belt-type transmission. The output end of the belt-type transmission is operably connected to the drivable wheels of a motor vehicle. Open-loop torque control for the power train of the motor vehicle is effected based on specific operating states of the power train and the mechanical tension acting on the belt of the continuously variable belt-type transmission.

12 Claims, 2 Drawing Sheets

METHOD AND DEVICE FOR ADJUSTING A TORQUE OUTPUT OF A POWER TRAIN OF A MOTOR VEHICLE

The invention concerns a method and a device for adjusting a torque output of a power train of a motor vehicle, wherein a driving machine is operably connectable to a driving end of a belt-type transmission and a driving end of the belt-type transmission is operably connected to drivable wheels or the like of the motor vehicle.

PRIOR ART

Drive arrangements of the aforesaid species are generally known. For example, it is known in particular to control internal combustion engines via open-loop electronic control units, in which case torque-influencing variables of the engine can be controlled. In this approach, the control can be of fuel injection and/or the advance angle. Depending on the desired engine management, a torque intervention can then be performed in the power train of the motor vehicle. A reduction of engine torque is also feasible by this means, although in this case the power train can be braked with no more than the drag torque of the internal combustion engine.

Further known, for example from EP 0 451 887 B1, are electronically controlled continuously variable transmissions whose gear ratios can be varied by means of an open-loop electronic control unit. Such transmissions include a wraparound means, for example a wraparound band, wraparound chain or the like, which is tensioned between driving cone sheaves and driven cone sheaves. In this arrangement, mechanical pressure can be exerted on the wraparound means via a hydraulic system. This mechanical pressure (contact pressure) can be varied over a broad range by open-loop control of the hydraulic system. During steady-state operation, a minimum contact pressure of about 5 to 15 bars is used to keep the power loss of the transmission as low as possible. This power loss results from the hydraulic losses of the hydraulic system and the friction losses of the wraparound means. Belt-type transmissions are designed so that they can also be operated at far higher pressures, for example of 30 to 50 bars. Nevertheless, for the efficiency of a belt-type transmission to be adjusted as optimally as possible, the contact pressure is set so that the wraparound means is prevented from slipping due to excessively low tension, while at the same time the tension must not be selected as too high in order to avoid high power losses.

ADVANTAGES OF THE INVENTION

The method of the invention offers the advantage that a torque intervention in the power train of a motor vehicle, especially a negative torque intervention, can take place more rapidly. Owing to the fact that open-loop torque control takes place, in particular a power loss is brought about in the power train, in dependence on specifiable operating states of the power train of a motor vehicle via the adjustment of a contact pressure acting on a wraparound means of the belt-type transmission, the torque output of the power train can be influenced in addition to or, where appropriate, in place of control of the advance angle or fuel injection of the internal combustion engine. In this way, negative torque interventions, particularly in excess of the drag torque of the internal combustion engine, can be performed on the power train via the power loss of the belt-type transmission.

Preferred embodiments of the invention will become apparent from the other features as recited in the dependent claims.

DRAWINGS

The invention will be described in more detail hereinbelow in an exemplary embodiment with reference to the accompanying drawings, wherein.

DESCRIPTION OF THE EXEMPLARY EMBODIMENT

Figure 1:
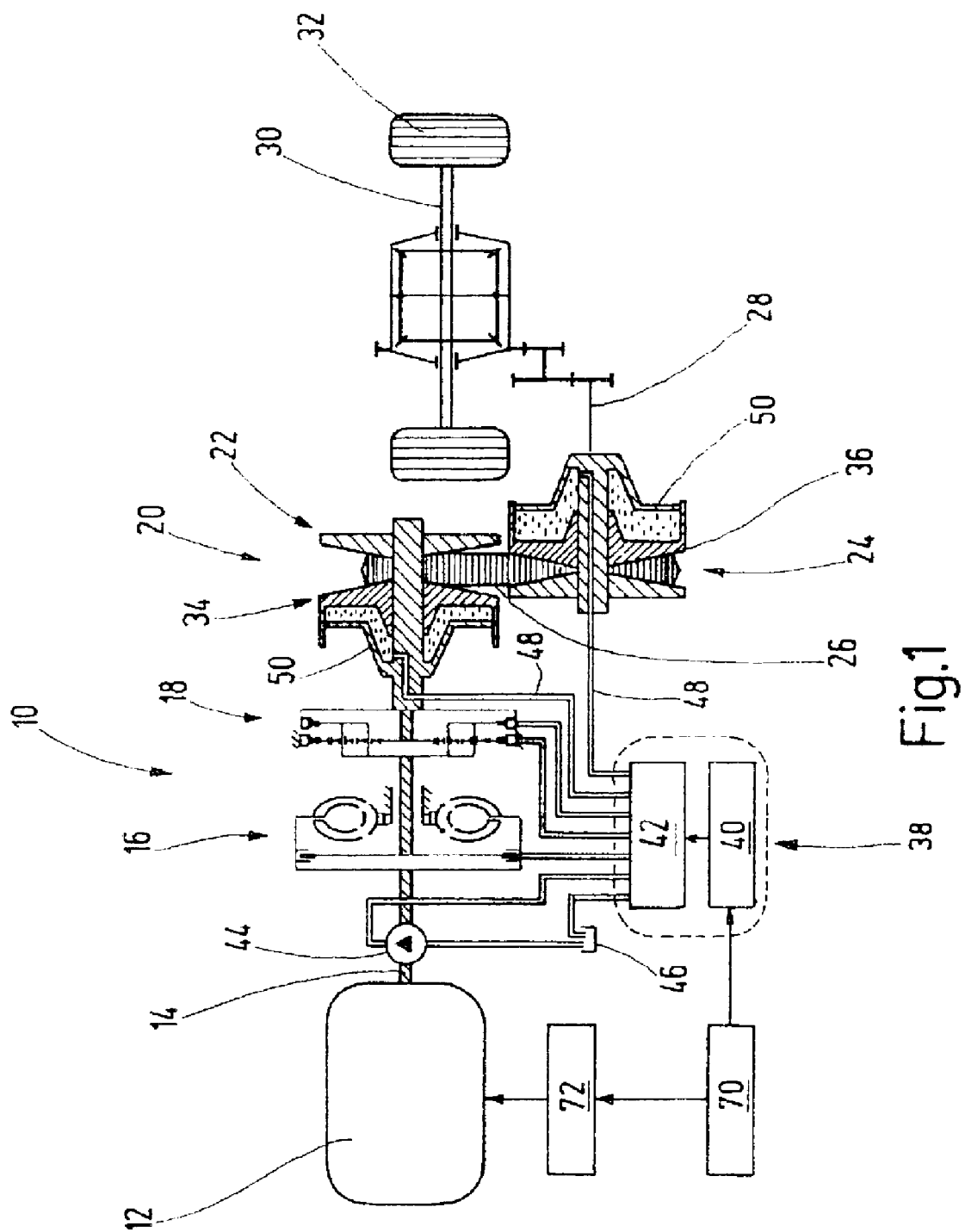
FIG. 1 is a schematic view of a power train of a motor vehicle.

FIG. 1 schematically illustrates a power train 10 of a motor vehicle. Said power train 10 includes an internal combustion engine 12, whose crankshaft 14 is operably connectable, via a clutch 16 and an intermediate gearbox 18, to a continuously variable transmission 20. Continuously variable transmission 20 is realized as a so-called belt-type transmission and includes a driving end 22 and a driven end 24. Driving end 22 and driven end 24 are connected to each other via a wraparound means 26, particularly a push-type link belt. A drive shaft 28 of transmission 20 is operably connected to a drive axle 30 of the motor vehicle, which bears drivable wheels 32.

Both driving end 22 and driven end 24 of transmission 20 include sheave pairs 34 and 36, respectively, between which wraparound means 26 is tensioned. The sheaves in each of sheave pairs 34 and 36 are able to move axially toward each other, enabling a mechanical contact pressure p acting on wraparound means 26 to be varied. The positioning movement of sheave pairs 34, 36 is brought about by means of a hydraulic unit denoted overall by 38. Hydraulic unit 38 includes an open-loop transmission control unit 40, which accesses hydraulic valves 42 (not shown individually). A build-up of pressure is effected by means of a hydraulic feed system 44, which is drivable by means of drive shaft 14 of internal combustion engine 12. For this purpose, fluid is fed from a tank 46 into the hydraulic circuit of unit 38. The structure and operation of hydraulic unit 38 will not be entered into in further detail in the present description, since these are generally known. As is evident, a pressure build-up in driving end 22 and driven end 24 of belt-type transmission 20 (CVT [continuously variable transmission]) can be achieved by means of unit 38 via hydraulic connections 48 indicated in the figure. In accordance with a pressure that becomes established in working chambers 50 therein and can, for example, be up to 50 bars, a contact pressure is exerted on wraparound means 26 via sheave pairs 34 and 36.

Figure 2:
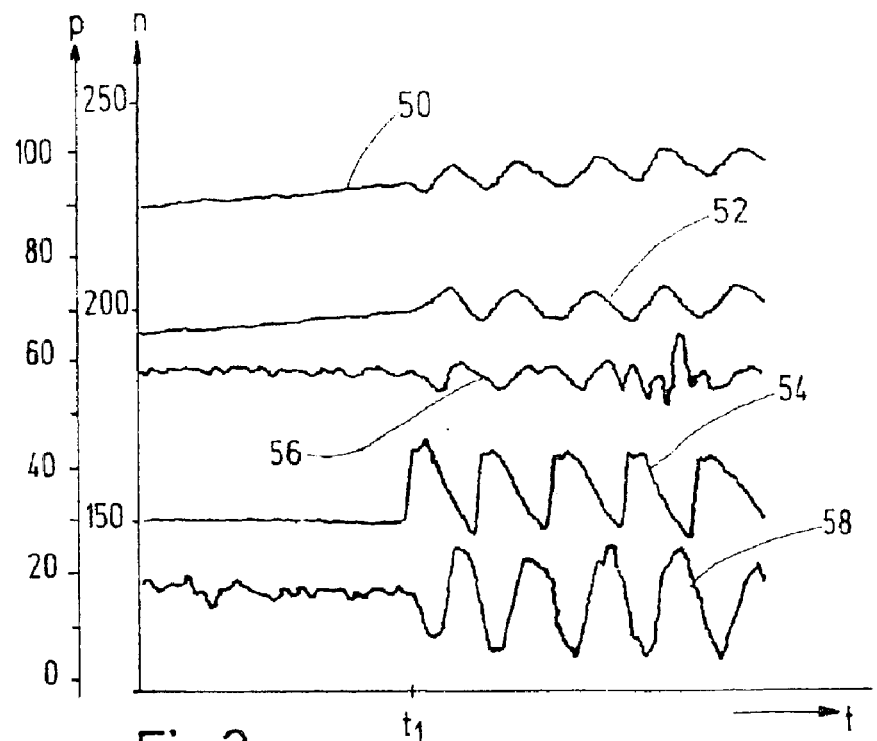
FIG. 2 shows various characteristic curves of the power train.

For purposes of clarification, FIG. 2 gives various characteristic curves of the power arrangement 10 depicted in FIG. 1. Thus, a first characteristic curve 50 illustrates the rotation speed $n_{28}$ of the drive shaft 28 of belt-type transmission 20. Characteristic curve 52 illustrates the rotation speed $n_{14}$ of the crankshaft 14 of internal combustion engine 12. A characteristic curve 54 illustrates the variation of the contact pressure p in the working chambers 50 of belt-type transmission 20, which ultimately acts via the sheave arrangements 34 and 36 on wraparound means 26. Finally, a further characteristic curve 56 has been plotted to illustrate the acceleration a of the vehicle, and a characteristic curve 58 illustrates the variation of the torque acting on drive shaft 30. All the curves are plotted over time.

The invention will now be explained on the basis of the characteristic curves provided in FIG. 2. Let us assume that at a time $t_1$, the pressure p is increased from 30 to 50 bars. Due to the accompanying increase in the power loss of power train 10 as a whole, the torque acting on drive axle 30 decreases, as characteristic curve 58 shows. The rotation speed $n_{28}$ of drive shaft 28 decreases during the same time, whereas the rotation speed $n_{14}$ of crankshaft 14 increases after a short delay. The acceleration a of the vehicle also diminishes, as characteristic curve 56 shows. An intermittent increase or decrease in pressure p (toggling) produces the curve shapes shown in FIG. 2, each fluctuation being accompanied by a proportional change in torque and thus in the rotation speed of drive axle 30.

These basic considerations and relationships can now be used to deliberately influence the torque output of the power train 10 in dependence on specified operating states. For example, an ultra-fast negative torque intervention can be made to take place in power train 10 in the following cases via an increase in the power loss of belt-type transmission 20:

anti-bucking function: torque intervention to prevent power train vibration;
load impact attenuation, torque reduction in connection with positive load changes to prevent uncomfortable load impacts, and also on resumption after a fuel cutoff phase of the internal combustion engine;
idle adjustment; engine speed stabilization when idling;
traction control: torque intervention to keep vehicle wheels from spinning;
$n_{max}$ limitation: torque intervention to prevent engine-speed overshoot or a rotation speed above the maximum speed of the internal combustion engine;
connection of an auxiliary unit (load), for example a vehicle air conditioning compressor; torque reduction on turn-on of the auxiliary unit, in which case the power loss of the belt transmission is increased slowly at first so that it can be reduced at the instant of turn-on of the auxiliary unit;
transmission intervention: for example to synchronize rotation speeds on engagement of the clutch of the transmission;
cylinder cutoff: prevention of uncomfortable torque fluctuations as individual cylinders of the internal combustion engine are switched on or off.

Figure 3:
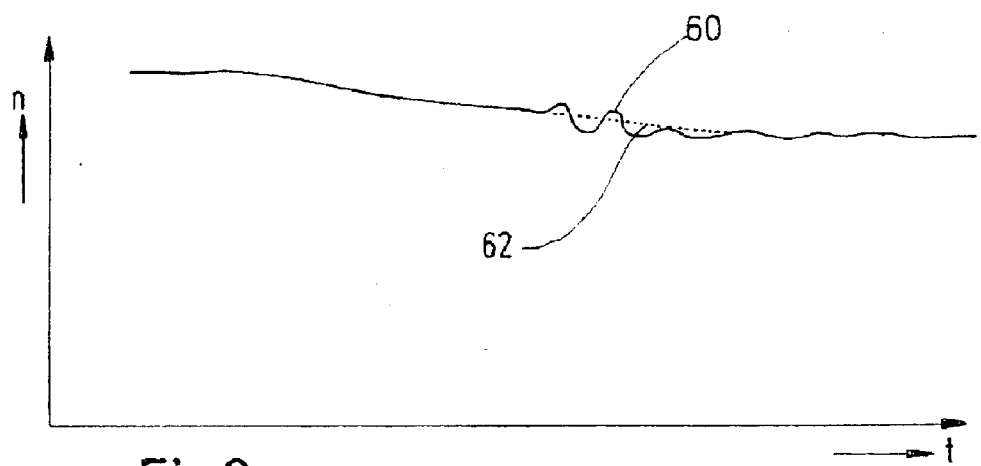
FIG. 3 shows a rotation-speed characteristic of the power train.

For purposes of clarification, the first function described, the anti-bucking function, is illustrated by turn-on[1] and thus closed-loop control of the power loss of the belt-type transmission 20 with reference to the characteristic curve shown in FIG. 3. The rotation speed n of the crankshaft 14 of internal combustion engine 12 is plotted over time. A first characteristic curve is denoted by 60 and shows the bucking of the internal combustion engine 12 within a given range of rotation speeds. Clearly evident here are fluctuations of rotation speed, which are transferred to the vehicle in the form of vibrations, thus detracting from comfort. The dashed curve 62 illustrates how the bucking (rotation-speed fluctuations) can be leveled out by torque intervention via closed-loop control of the power loss of the belt-type transmission 20. This yields a considerable improvement in vehicle comfort.

Figure 4:
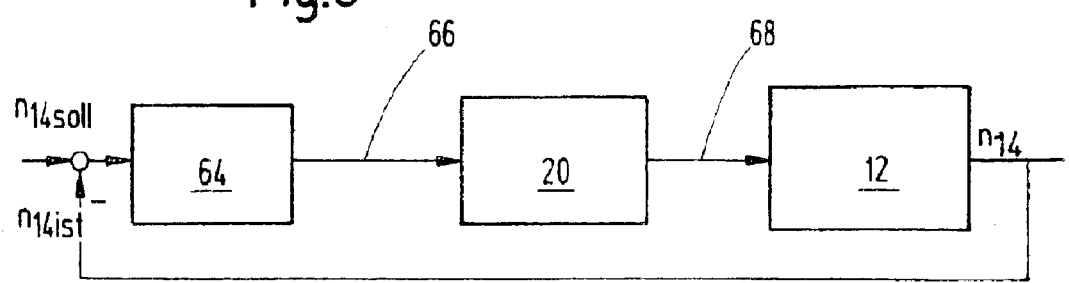
FIG. 4 is a block circuit diagram for implementing the method of the invention.

FIG. 4 is a block circuit diagram of the closed-loop control chain for the anti-bucking function. The rotation speed $n_{14nominal}$ is specified by means of an open-loop control unit. At the same time, the directly controlled variable $n_{14actual}$, i.e., the actual rotation speed of crankshaft 14, is specified to a closed-loop controller 64. Closed-loop controller 64 is, for example, a PID [Proportional, Integral, Derivative] controller. According to the control deviation between rotation speed $n_{14nominal}$ and rotation speed $n_{14actual}$, closed-loop controller 64 outputs a signal 66 that corresponds to a change in the contact pressure p of belt-type transmission 20. This signal 66 is routed via hydraulic unit 38 to belt-type transmission 20, whereupon the power loss of belt-type transmission 20 changes as explained hereinabove. This brings about a change in the read torque (signal 68) of internal combustion engine 12, causing crankshaft 14 of internal combustion engine 12 to assume actual rotation speed $n_{14actual}$, corresponding to nominal rotation speed $n_{14nominal}$. Deviations of rotation speed $n_{14actual}$ from rotation speed $n_{14nominal}$ are compensated for by the closed control loop.

Actual rotation speed $n_{14actual}$ therefore follows the specified variation of nominal rotation speed $n_{14nominal}$.

Alternatively, instead of being based on a constant variation of rotation speed n, the control can be based on a constant variation of the torque m at driving axle 30 and thus at the output of transmission 20.

The manner in which this closed-loop control takes place is also indicated schematically in FIG. 1. The open-loop transmission control unit 40—via which contact pressure p and thus the power loss of belt-type transmission 20 can be adjusted—receives a corresponding specified value (signal 66 from FIG. 4) from a higher-order coordinator 70. The coordinator 70 thus includes, among other things, closed-loop controller 64. Coordinator 70 also cooperates with an open-loop engine control unit 72, which controls the drive, for example the ignition angle, injection times and the like, for the internal combustion engine 12. As a result of this coordinated cooperation via coordinator 70, the power loss of belt-type transmission 20 can be adjusted in a manner that is adapted to selectable, specifiable operating states of the power train 10.

In the exemplary embodiment described above, reference was made to a steplessly variable belt-type transmission 20. In principle, the invention is also usable for automatic transmissions that can be shifted in steps. Due to the low hydraulic pressures, however, the shiftable power loss would be correspondingly lower in that case.

It can be stated overall that precise, fine apportioning of braking action, i.e., particularly of negative torque intervention, can be achieved by means of the invention. The power loss of the belt-type transmission 20, and thus the braking action, can be varied over a wide range. For example, in the case of a six-cylinder engine with a swept volume of 2.8 liters, the contact pressure p of the belt-type transmission 20 in a vehicle traveling at a road speed of 140 km/h can be 9 bars. This corresponds to a power loss of about 10 kW. Tripling the contact pressure and thus the power loss to about 30 kW would entail no disadvantages for the belt-type transmission 20, especially the wraparound means 26 (push-type link belt). This would permit the rapid conversion of torque demand, especially negative torque demand, in about 20 to 30 ms. The variation of loss power to effect torque intervention can be used in addition to or alternatively to prior-art methods of influencing torque, for example controlling injection time and ignition angle. This, therefore, means that the changes in the power loss of the belt-type transmission 20 effected by varying the tension of the wraparound means 26 can take place within a central torque coordinating system for power train 10 as a whole. This also means, among other things, that it can also be contemplated to vary the power loss of the belt-type transmission 20 on the basis of vehicle acceleration, for example. It is of no consequence whether such a change in power loss is generated on the basis of acceleration or on the basis of deliberate impairment of the efficiency of the belt-type transmission 20.

What is claimed is:

1. A method for adjusting a torque output of a power train of a motor vehicle, said method comprising:

providing a driving machine operably connected to a continuously variable belt-type transmission, the transmission comprising a belt and two sheaves and being operably connected to drivable wheels of a motor vehicle; and providing open-loop torque control of the power train including adjusting the tension acting on the belt based upon specifiable operating states of the power train.

2. The method of claim 1 wherein control of the power train further includes adjusting the transmission to cause a deliberate power loss for the power train.

3. The method of claim 2 wherein the driving machine is an internal combustion engine and the open-loop control of the power train providing a deliberate power loss for the power train is coordinated with open-loop torque-influencing control of the internal combustion engine.

4. The method of claim 1 wherein the control of the power train further includes providing closed-loop anti-bucking control of the power train.

5. The method of claim 1 wherein the control of the power train further includes providing closed-loop impact attenuation control of the power train.

6. The method of claim 1 wherein the control of the power train further includes providing closed-loop idle control of the power train.

7. The method of claim 1 wherein the control of the power train further includes providing closed-loop traction control of the power train.

8. The method of claim 1 wherein the driving machine is an internal combustion engine having a crankshaft and the control of the power train further includes limiting the rotation speed of the crankshaft.

9. The method of claim 1 wherein the power train includes a clutch and control of the power train further includes synchronization of rotational speeds upon engagement of the clutch.

10. The method of claim 1 wherein the driving machine is an internal combustion engine and control of the power train further includes providing closed-loop torque control of the power train upon switching a cylinder to one of an on and off condition.

11. The method of claim 1 wherein the control of the power train further includes providing closed-loop torque control of the power train upon turn-on of an auxiliary unit.

12. A device for adjusting a torque output of a power train of a motor vehicle, said device comprising:

an engine;

a continuously variable belt-type transmission comprising a belt and two sheaves operably connected to said driving machine;

drivable wheels operably connected to said transmission; and wherein said device adjusts the tension acting on said belt to cause a power loss in the power train based upon specifiable operating states of the power train.

* * * * *